(12) United States Patent
Asahara

(10) Patent No.: US 9,026,626 B2
(45) Date of Patent: May 5, 2015

(54) MANAGEMENT DEVICE, INFORMATION PROCESSING SYSTEM, MANAGEMENT METHOD, AND STORAGE MEDIUM

(71) Applicant: Canon Kabushiki Kaisha, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 13/668,459

(22) Filed: Nov. 5, 2012

(65) Prior Publication Data

US 2013/0132530 A1    May 23, 2013

(30) Foreign Application Priority Data

Nov. 17, 2011   (JP) ................................. 2011-251464

(51) Int. Cl.
| | |
|---|---|
| G06F 15/16 | (2006.01) |
| H04N 1/00 | (2006.01) |
| H04N 1/44 | (2006.01) |

(52) U.S. Cl.
CPC ....... H04N 1/00344 (2013.01); H04N 1/00838 (2013.01); H04N 1/4406 (2013.01)

(58) Field of Classification Search
CPC .......... H04N 1/00344; H04N 1/00838; H04N 1/4406

USPC ......................................................... 709/220
See application file for complete search history.

(56) References Cited

U.S. PATENT DOCUMENTS

| | | | |
|---|---|---|---|
| 8,316,423 B2 * | 11/2012 | Nishimi ............................ | 726/5 |
| 2010/0161837 A1 * | 6/2010 | Miyajima ......................... | 710/8 |
| 2012/0215662 A1 | 8/2012 | Ito | |

FOREIGN PATENT DOCUMENTS

| | | |
|---|---|---|
| JP | 4454280 B | 2/2010 |
| JP | 2011-100226 A | 5/2011 |

OTHER PUBLICATIONS

Korean Office Action issued in corresponding application No. 10-2012-0126577 on Feb. 27, 2015.

* cited by examiner

*Primary Examiner* — Bryan Lee
(74) *Attorney, Agent, or Firm* — Carter, DeLuca, Farrell & Schmidt, LLP

(57) ABSTRACT

A device management service receives acquisition request of application information for the application to be applied from the image forming apparatus, generates and transmits application information corresponding to the image forming apparatus when device configuration information of the image forming apparatus satisfies a applicable condition of the application included in basic set application information and a license for utilizing to apply to the image forming apparatus is present.

8 Claims, 14 Drawing Sheets

FIG. 4A

| Data type | Setting value |
|---|---|
| Model code | 0x01 |
| Serial ID | AAA00001 |
| Firmware version | 00.01 |
| HDD option | Yes |
| IC card RW | Yes |

FIG. 4B

| Data type | Setting value |
|---|---|
| Model code | 0x01 |
| Serial ID | AAA00002 |
| Firmware version | 00.01 |
| HDD option | No |
| IC card RW | Yes |

FIG. 4C

| Data type | Setting value |
|---|---|
| Model code | 0x02 |
| Serial ID | BBB00001 |
| Firmware version | 01.00 |
| HDD option | Yes |
| IC card RW | Yes |

FIG. 5A

| Article ID | Article name | Restricted operation | Applicable condition |
|---|---|---|---|
| 1 | IC card login | Job not permitted | IC card RW |
| 2 | Job audit agent | Job not permitted | |
| 3 | HDD encryption | Box not permitted | HDD |

FIG. 5B

| Article ID | Article name | The number of license | Remaining license | License number |
|---|---|---|---|---|
| 1 | IC card login | ∞ | ∞ | – |
| 2 | Job audit agent | 2 | 0 | 0001,0002 |
| 3 | HDD encryption | 2 | 0 | 0101,0102 |
| 4 | Temporarily stored printing | 1 | 0 | 0201 |

FIG. 6A

| Article ID | Article name | Restricted operation | Status |
|---|---|---|---|
| 1 | IC card login | Job not permitted | Installed |
| 2 | Job audit agent | Job not permitted | Installed |
| 3 | HDD encryption | Box not permitted | Installed |
| 4 | Temporarily stored printing | No | Installed |

FIG. 6B

| Article ID | Article name | Restricted operation | Status |
|---|---|---|---|
| 1 | IC card login | Job not permitted | Waiting install |
| 2 | Job audit agent | Job not permitted | Lack of licenses |

FIG. 6C

| Article ID | Article name | Restricted operation | Status |
|---|---|---|---|
| 1 | IC card login | Job not permitted | Installed |
| 2 | Job audit agent | Job not permitted | Installed |

FIG. 11

Web Browser

Device management service menu

License management menu

Individual install registration of application

| | Article ID | Article name | Target device | The remaining number |
|---|---|---|---|---|
| ☐ | 1 | Temporarily stored printing | AAA00002 | 0 |

[Delete selected row] [Add row] [Cancel] [OK]

FIG. 12A

Web Browser

Device management service menu

License management menu

Installation status of application

| Device identifier | Installed | Waiting install | Lack of licenses |
|---|---|---|---|
| AAA00001 | 1,2,3 | No | No |
| BBB00001 | 1,2,4 | No | No |

Web Browser

Device management service menu

License management menu

Installation status of application

| Device identifier | Installed | Waiting install | Lack of licenses |
|---|---|---|---|
| AAA00001 | 1,2,3 | No | No |
| AAA00002 | No | 1 | 2 |
| BBB00001 | 1,2,4 | No | No |

Web Browser

Device management service menu

License management menu

Installation status of application

| Device identifier | Installed | Waiting install | Lack of licenses |
|---|---|---|---|
| AAA00001 | 1,2,3 | No | No |
| AAA00002 | 1 | No | 2 |
| BBB00001 | 1,2,4 | No | No |

OK

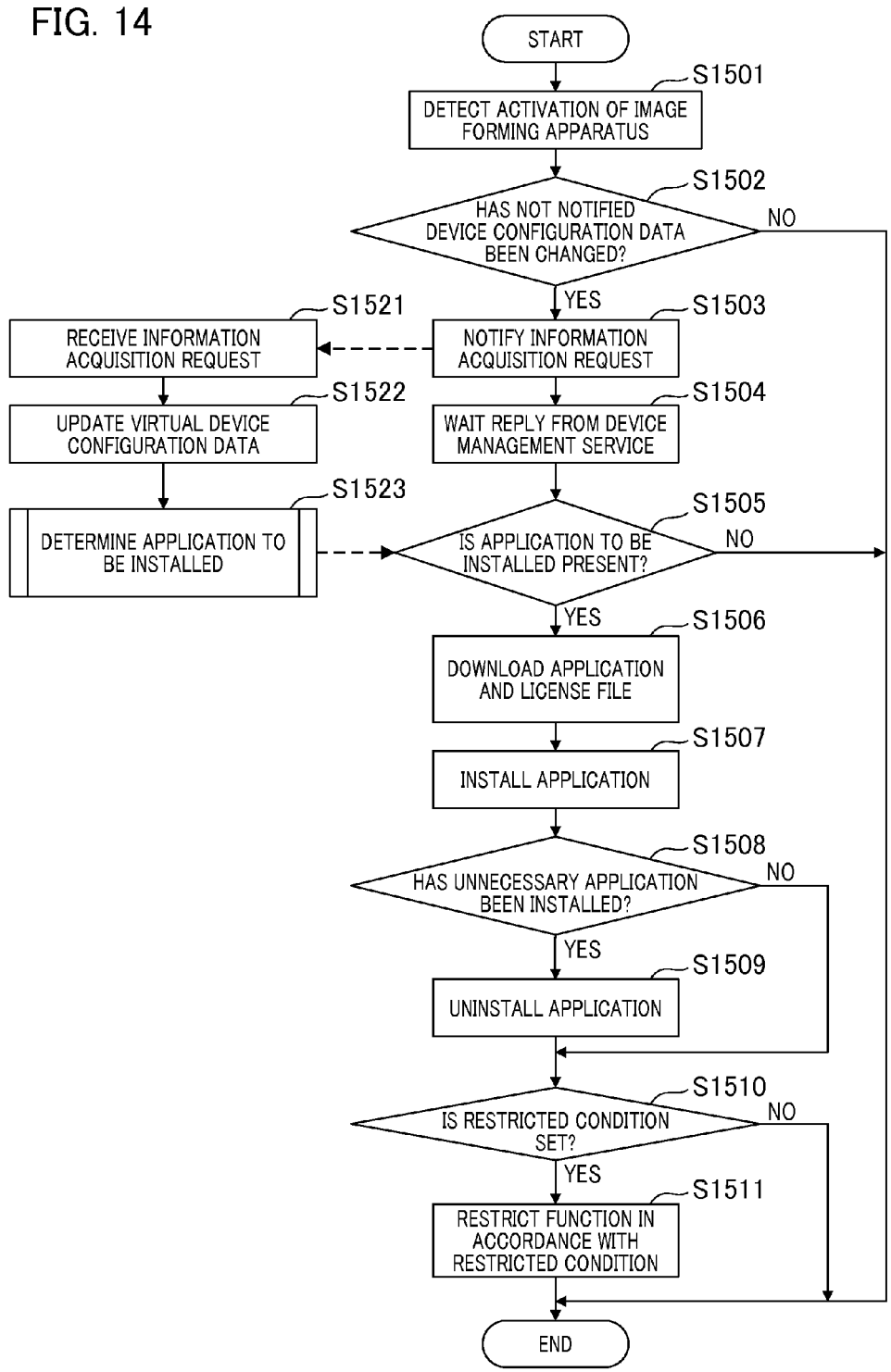

MANAGEMENT DEVICE, INFORMATION PROCESSING SYSTEM, MANAGEMENT METHOD, AND STORAGE MEDIUM

BACKGROUND OF THE INVENTION

1. Field of the Invention

The present invention relates to a management device, an information processing system, a management method, and a storage medium.

2. Description of the Related Art

Various applications run on an image forming apparatus. An application that runs on the image forming apparatus is, for example, a program included in a firmware of the image forming apparatus in advance or a program additionally installed later. When these applications are treated as an optional product, there is need to allow a user to use only an application for which a fee was paid by the user. Therefore, there has been proposed the scheme that proves payment of the fee by the user with a license file when an installed program is activated or a program is additionally installed.

The activation or installation of the optional product causes the management costs for the IT manager increase. In the light of this case, for example, Japanese Patent No. 4454280 discloses a system that manages a license in an authentication device, and installs an application after confirming the number of licenses in the authentication device. Also, a technique is envisioned in which installation is simultaneously instructed from the application on a PC to a plurality of the image forming apparatus Device configuration date in the image forming apparatus may be changed due to the purchase of a new image forming apparatus by the user. In this case, the IT manager needs to reconfigure the distribution instructions of the application corresponding to the image forming in which the data has been changed. Thus, the management cost for the IT manager cannot be reduced.

SUMMARY OF THE INVENTION

The management device of the present invention automatically distributes an application to be applied to the image forming apparatus when device configuration information of the image forming apparatus has been changed.

According to an aspect of the present invention, a management device is provided that manages applying an application to an image forming apparatus for each preset management range. The management device includes a basic information storage unit configured to store basic information including at least identification information and applicable conditions for the application, the basic information being about the application as a subject to apply in common with the image forming apparatus that belongs to the management range; a license information storage unit configured to store license information including at least the number of licenses and a remaining number of the license assigned to the user, the license information being about the license of the application that is applied to the image forming apparatus being used by the user and belonging to the management range of the user; a request reception unit configured to receive an information acquisition request, which includes device configuration information of the image forming apparatus, from the image forming apparatus via a network when the device configuration information has been changed in the image forming apparatus, the information acquisition request being about the application that is applied to the image forming apparatus; a first determining unit configured to determine whether or not the device configuration data included in the received information acquisition request satisfies the applicable condition of the application included in the basic information; a second determining unit configured to determine whether or not the license used to apply the application to the image forming apparatus is present based on the remaining number corresponding to the application included in the license information stored in the license information storage unit when the first determining unit has determined that the device configuration data satisfied the applicable conditions of the application included in the basic information; an information generating unit configured to generate application information necessary for applying the application by the image forming apparatus that is the transmission source of the information acquisition request when the second determination unit has determined that the license used to apply the application to the image forming apparatus was present; and an information transmission unit configured to transmit the generated application information to the image forming apparatus that is the transmission source of the information acquisition request via the network.

Further features of the present invention will become apparent from the following description of exemplary embodiments (with reference to the attached drawings).

BRIEF DESCRIPTION OF THE DRAWINGS

FIGS. 4A to 4C are exemplary diagrams illustrating an actual device configuration data.

FIG. 5A is diagram illustrating an example of basic set application information.

FIG. 5B is a diagram illustrating an example of tenant license data.

FIGS. 6A to 6C are diagrams illustrating an example of virtual license data.

FIG. 11 is an individual install registration screen.

FIG. 12A to FIG. 12C are display examples of an install status confirmation screen.

FIG. 14 is a diagram for explaining the processing for applying the application to the image forming apparatus.

DESCRIPTION OF THE EMBODIMENTS

Figure 1:
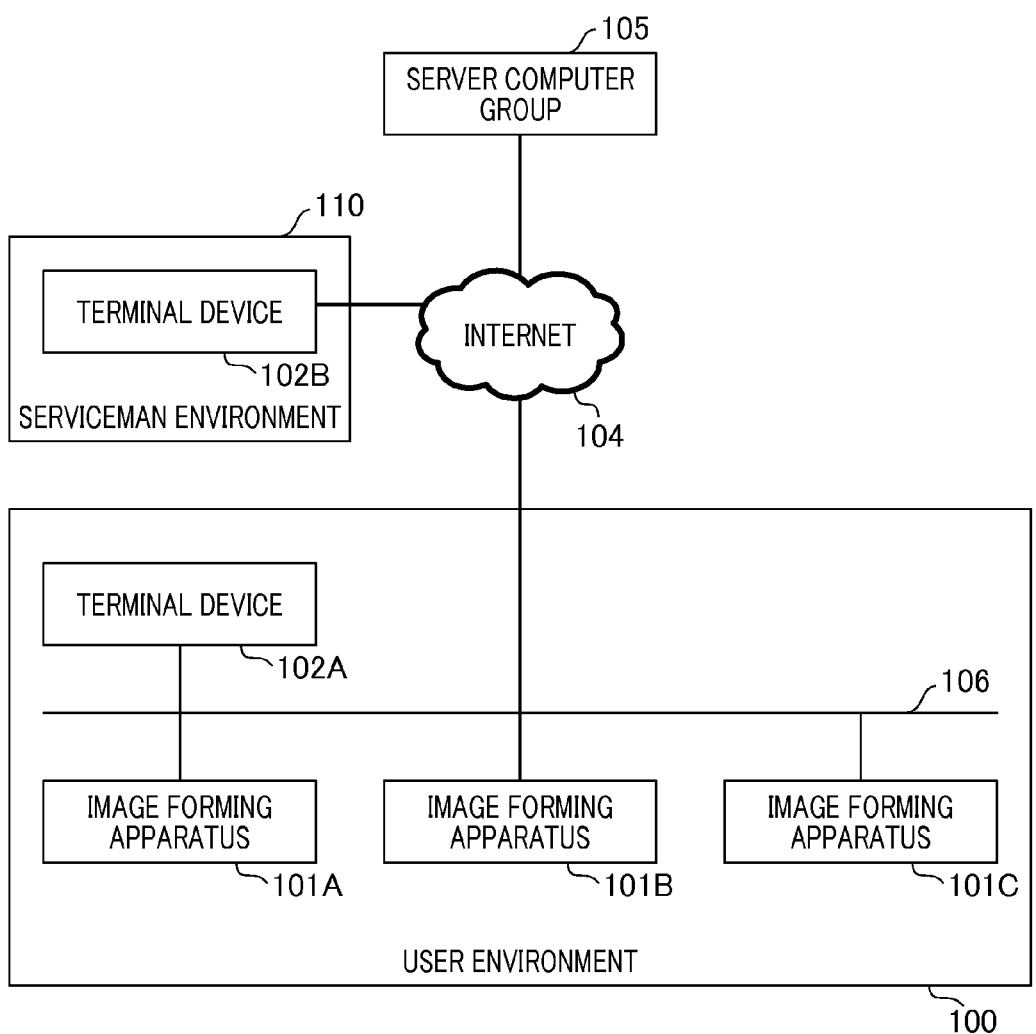
FIG. 1 is a diagram illustrating an exemplary overall configuration of a present embodiment.

Hereinafter, a description will be given of the information processing system of the present embodiment. Firstly, the terms used in the present embodiment are defined. The term "device configuration data" refers to configuration information included in the image forming apparatus. For example, data indicating whether or not a HDD (Hard Disk Drive) option is provided in the image forming apparatus meets device configuration data. Device configuration data may include a model code for uniquely identifying the model of the image forming apparatus, a serial ID for individually identifying each image forming apparatus, or a firmware version running on the image forming apparatus.

The term "license number" refers to a number which a user receives when the user has purchased a product. The license number includes information associating with the purchased product. In the present embodiment, the license number includes information about the available number of licenses. The term "license file" refers to a file that installs or activates an application. In other words, the license file is a file which the image forming apparatus requires for applying the application. The license file includes a secret key for decoding an encrypted application, and certificate data that certifies the legitimate license file, and the like. The license file may be generated using the license number. Hereinafter, an installation or an activation of application with the license file refers to "installation of the application". That is, processing to store a substance of the application in the information system is not necessarily included in the installation of the application.

The term "license data" refers to either the license number or the license file. The term "device-individual license" is a license imposed restriction where the license can be only be used in the image forming apparatus with a specific serial ID. The term "device-common license" refers to a license available in the image forming apparatus with any serial ID. If the image forming apparatus uses the device-common license, only one license file is needed, thus no management by using the license number is needed. The user who uses the image forming apparatus pays a fee according to the number of installed applications later.

The term "virtual device" refers to a data group of actual devices held by a server computer group. "Virtual device" is abstract concept, and does not need actually to include data of the virtual device. In particular, the virtual device includes at least device configuration data and license data.

The term "tenant" refers to a management range of a user (a consigner) who consigns management of the image forming apparatus. The term "tenant identifier" refers to an identifier for identifying the tenant. For example, it is assumed that a certain enterprise consigns management of the image forming apparatuses, 101A, 101B and 101C, provided in the user environment 100. In such case, one tenant identifier corresponding to the user environment 100 is assigned and the image forming apparatuses 101A, 101B, and 101C are identified as the image forming apparatus belonging to the tenant and managed.

For distinguishing data included in the virtual device, data held by the actual device, and tenant dedicated data, respective data is defined as follows. Device configuration data is described as virtual device configuration data, and license data is described as virtual license data included in the virtual device. Device configuration data is described as actual device configuration data, and license data is described as actual license data held by the actual device. Whole license data purchased by the tenant is described as tenant license data. Also, a basic set application is an application commonly used in a plurality of image forming apparatuses that belong to the tenant.

FIG. 1 is a diagram illustrating exemplary general configuration of the present embodiment. The system shown in FIG. 1 includes a user environment 100, a server computer group 105, and a serviceman environment 110. The user environment 100 and the serviceman environment 110 communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. Hereinafter, the image forming apparatuses 101A, 101B, or 101C are disclosed as the image forming apparatus. A network 106 is a network that is capable of providing digital communication on the user environment 100. The image forming apparatuses 101A to 101C are capable of accessing to the Internet 104 through the network 106. The terminal device 102A is a computer that is operable by the user under the user environment 100. The terminal device 102A is also capable of accessing to the Internet 104 through the network 106.

The server computer group 105 is the server group that provides service via the Internet 104. In the present embodiment, the server computer group 105 functions as a management device that manages an application to be applied to the image forming apparatus. In particular, the server computer group 105 realizes a device management service 310 shown in FIG. 3.

The serviceman environment 110 is an environment in which the serviceman manages the image forming apparatus by using the terminal device 102B. The serviceman environment 110 includes the terminal device 102B. The terminal device 102B is a computer operated by the serviceman who manages the image forming apparatuses 101A, 101B, and 101C. The terminal device 102B is capable of accessing the Internet 104. As hereinafter described, terminal devices 102A and 102B are also disclosed as a terminal device 102.

Figure 2:
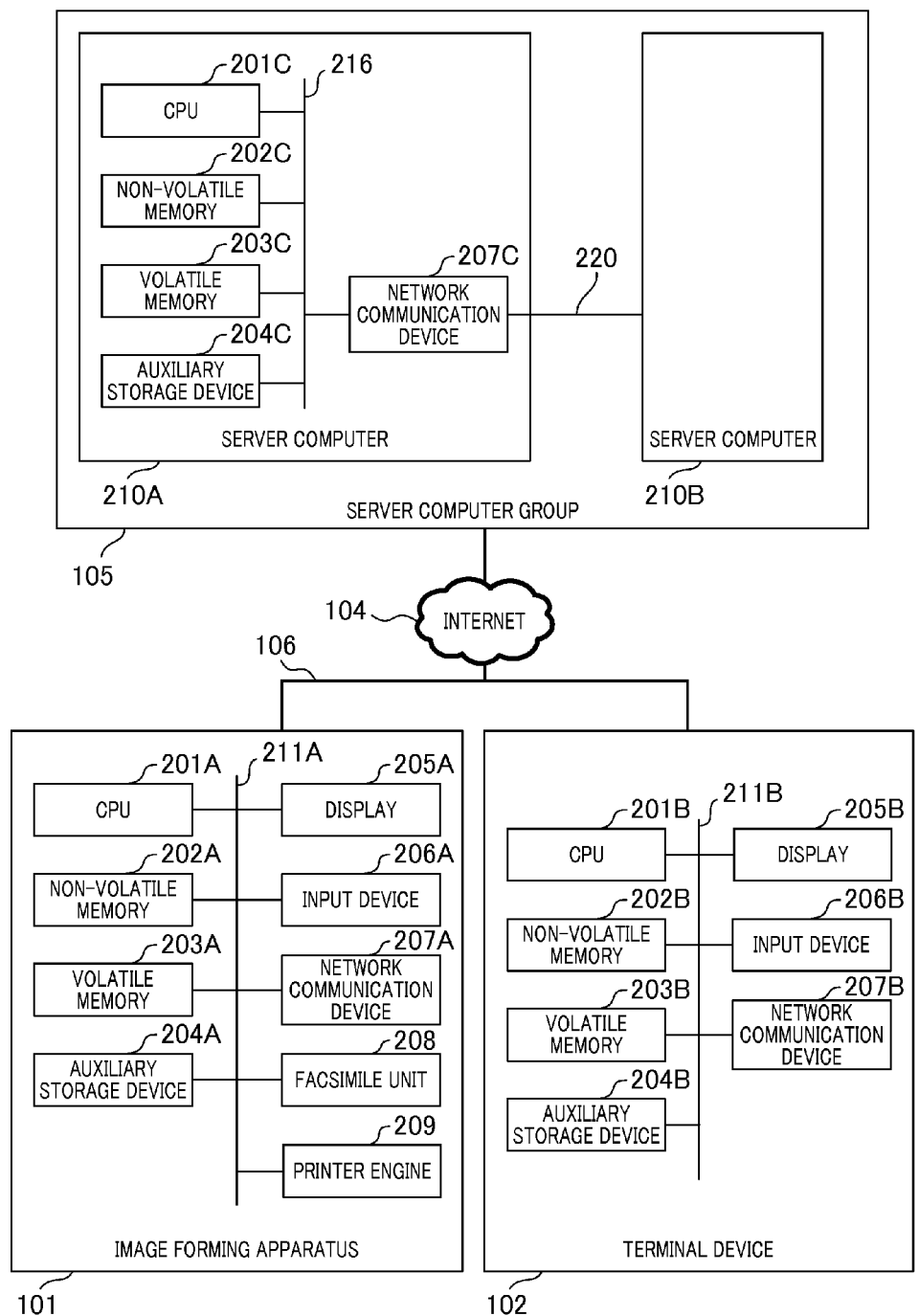
FIG. 2 is a diagram illustrating an example of the hardware configuration of an information processing system.

FIG. 2 is a diagram illustrating an example of the hardware configuration of the information processing system in the present embodiment. The server computer group 105 includes a server computer 210A and a server computer 210B. The server computer 210B has the same configuration as the server computer 210A. The server computer 210A and server computer 210B communicate with each other via a network 220.

The server computer 210A includes a CPU 201C through a network communication device 207C, which are connected to an internal bus 216. The image forming apparatus also includes a CPU 201A through 209, which are connected to an internal bus 211A. Also, the terminal device 102 includes CPU 201B through a network communication device 207B, which are connected to an internal bus 211B.

As hereinafter described, CPUs 201A, 201B, and 201C are disclosed as a CPU 201; non-volatile memories 202A, 202B, and 202C are disclosed as a non-volatile memory 202; volatile memories 203A, 203B, and 203C are disclosed as a volatile memory; auxiliary storage devices 204A, 204B, and 204C are disclosed as an auxiliary storage device 204; the displays 205 and 205B are disclosed as a display 205; input devices 206A and 206B are disclosed as an input device 206; network communication devices 207A and 207B are disclosed as a network communication device 207; the internal bus 211A, and 211B are disclosed as an internal bus 211.

CPU (Central Processing Unit) 201 executes a program and controls various processing. The non-volatile memory 202 includes ROM (Read Only Memory). A program and data required for the early stage during the boot processing are stored in the non-volatile memory 202. The volatile memory 203 includes RAM (Random Access Memory). The volatile memory 203 is used as a temporary storage space for the program and data.

The auxiliary storage device 204 is a large-capacity storage device such as a hard disk and a RAM drive. The auxiliary storage device 204 stores a large amount of data and holds an executable code of the program. The auxiliary storage device 204 stores data which needs to be held for a longer time than that of the volatile memory 203. The display 205 performs display processing of information and notifies the user about information. Note that the term "user" refers to the user and the serviceman in the present embodiment.

The input device 206 receives an instruction selected by the user, and transmits the selected instruction to the program via the internal bus 211. The network communication device 207 communicates with an external device via the network.

The facsimile unit 208 is a hardware unit that transmits imaging data formed by the image forming apparatus or imaging data stored in the auxiliary storage device 204A to the external device via the network 106. The facsimile unit 208 may be an option and the image forming apparatus may not include the facsimile unit 208. A printer engine 209 prints imaging data formed by the image forming apparatus or imaging data stored in the auxiliary storage device 204A to a paper media.

Figure 3:
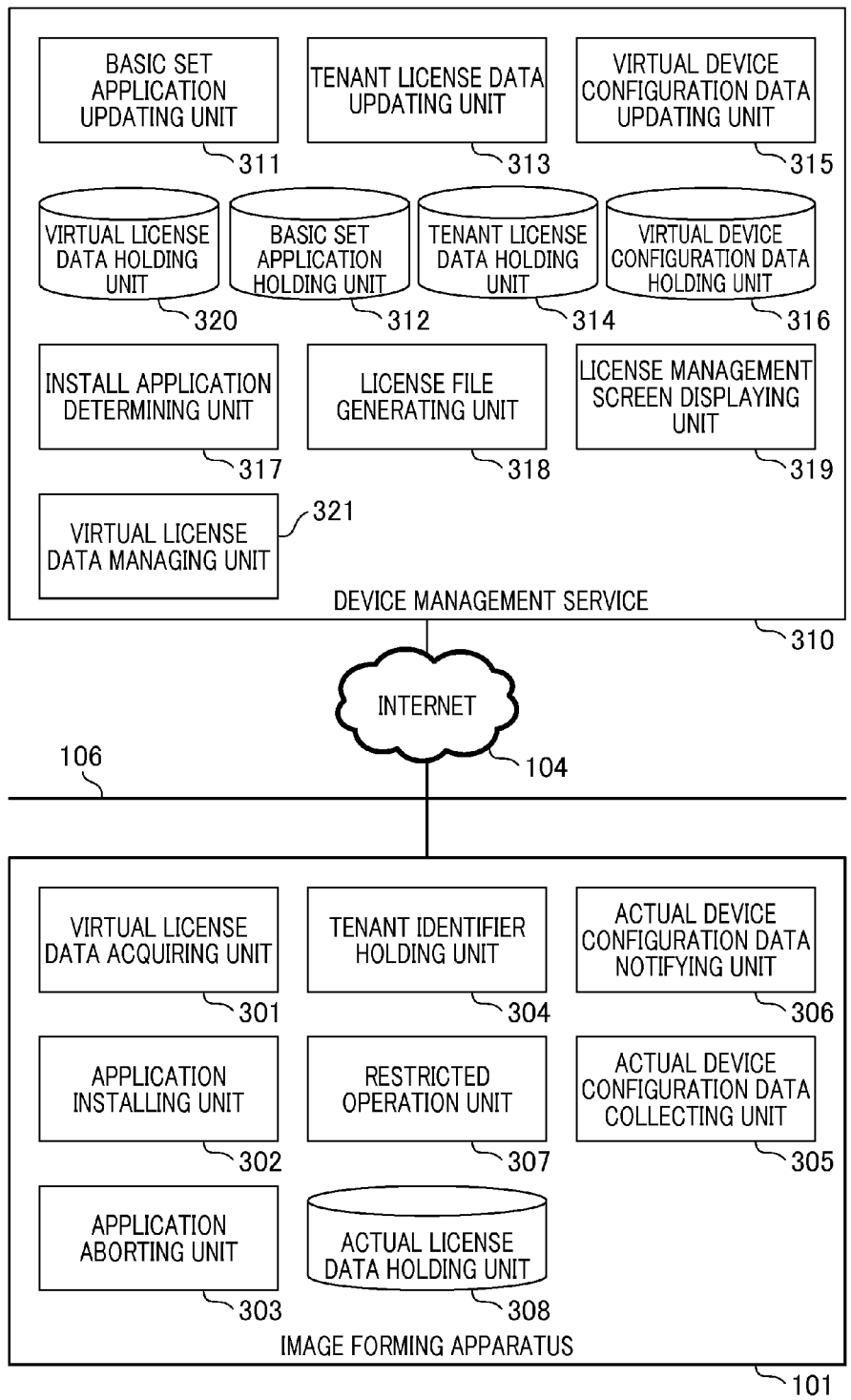
FIG. 3 is an example of a functional block diagram of the information processing system.

FIG. 3 is an example of a functional block diagram of the information processing system in the present embodiment. The information processing system shown in FIG. 3 includes the image forming apparatus and a device management service 310. The image forming apparatus includes a virtual license data acquiring unit 301, an application installing unit 302, an application aborting unit 303, a tenant identifier holding unit 304, and an actual device configuration data collecting unit 305. The image forming apparatus also includes an actual device configuration data notifying unit 306, a restricted operation unit 307, and an actual license data holding unit 308.

The virtual license data acquiring unit 301 acquires virtual license data and a license file corresponding to the virtual license data from the virtual license data managing unit 321 in the device management service 310 via the Internet 104. The virtual license data acquiring unit 301 may acquire virtual license data and the license file corresponding to the virtual license data, and the application from the virtual license data managing unit 321.

The application installing unit 302 installs the application acquired from the virtual license data managing unit 321 on the image forming apparatus with the license file. The application installing unit 302 may also install the application included in the image forming apparatus in advance.

The application aborting unit 303 aborts or uninstalls the application installed on the image forming apparatus under the predetermined condition. The tenant identifier holding unit 304 stores the tenant identifier indicating identification information for the tenant to which the image forming apparatus belongs. In particular, the tenant identifier is set when the image forming apparatus is initially located, and stored in the auxiliary storage device 204A so as not to be lost when the power is off. The actual device configuration data collecting unit 305 collects device configuration data (actual device configuration data) of the image forming apparatus.

FIGS. 4A to 4C are examples of actual device configuration data of three image forming apparatuses that belong to one certain tenant. In other words, actual device configuration data is associated with the tenant identifier of the tenant to which the image forming apparatus belongs. Actual device configuration data has a data item such as a setting value of data type. The data type is a type of data included in actual device configuration data. A model code for identifying the model, a firmware version, and a serial ID that functions as a device identifier for identifying the device, and the like are set in the data type.

Values (such as a value of the serial ID, present or absence of the facsimile unit) corresponding to the data type are set in the setting value. As hereinafter described, the serial ID is employed accordingly to distinguish and indicate the image forming apparatus. For example, the image forming apparatus having the serial ID is AAA00001 is described as a device AAA00001. Note that virtual device configuration data has the same data configuration as actual device configuration data. Thus, each actual device configuration data shown in FIGS. 4A to 4C is described as virtual device configuration data.

The actual device configuration data notifying unit 306 notifies the virtual device configuration data updating unit 315 of the device management service 310 of actual device configuration data collected by the actual device configuration data collecting unit 305 and the tenant identifier held by the tenant identifier holding unit 304. In particular, the actual device configuration data notifying unit 306 transmits an information acquisition request that includes actual device configuration data and the tenant identifier to the virtual license data managing unit 321. The information acquisition request is a request for acquiring information about the application applied to the image forming apparatus. The information acquisition request includes configuration information (actual device configuration data) about the image forming in which configuration information has been changed and a tenant identifier.

The restricted operation unit 307 makes the image forming apparatus operate (a restricted operation) as limiting functions of the mage forming device 101 based on information about the restricted operation set in the virtual license acquired by the virtual license data acquiring unit 301.

The actual license data holding unit 308 stores license data (actual license data) corresponding to the image forming apparatus. The form of actual license data is equivalent to virtual license data.

The device management service 310 functions as a management device that manages the application to be applied to the image forming apparatus for predetermined individual management range (for each tenant) of the user. The device management service 310 includes a basic set application updating unit 311, a basic set application holding unit 312, a tenant license data updating unit 313, a tenant license data holding unit 314, and a virtual device configuration data holding unit 316. Also the device management service 310 includes an install application determining unit 317, a license file generating unit 318, a license management screen displaying unit 319, and a virtual license data managing unit 321.

The basic set application updating unit 311 changes basic set application information. The basic set application holding unit 312 also functions as a basic information storage unit that stores basic set application information to the auxiliary storage device 204 and the like. Basic set application information is information about the application to be commonly applied to the image forming apparatus that belongs to the tenant, and includes at least identification information of the application and an applicable condition of that application.

FIG. 5A and FIG. 5B are diagrams respectively illustrating an example of basic set application information and a tenant license data. FIG. 5A indicates basic set application information. Basic set application information is information about a basic set application, and has a data item such as an article ID, an article name, a restricted operation, an applicable condition. The article ID is an identifier that uniquely specifies the article of the application. The article name is the designation of the article. The restricted operation is a restricted operation executed by the image forming apparatus in case the image forming apparatus failed to install the relevant application. If there is no license available for use in applying the application to the image forming apparatus, the application is not installed on the image forming apparatus. In other words, information set in "restricted operation" included in basic set application information functions as control information instructing that the image forming apparatus image be applied the application of the restricted operation if there is no license for use in applying the application to the image forming apparatus.

The applicable condition is a condition which the image forming apparatus should satisfy in order to install the relevant application. For example, an IC card RW and an HDD set in the applicable condition means that the image forming apparatus has to include the IC card RW and the HDD in order to install the relevant application.

The tenant license data updating unit 313 updates tenant license data. Also, the tenant license data holding unit 314 holds tenant license data that functions as license information (and functions as a license information storage unit). Tenant license data relates to a license of the application that is applied to the image forming apparatus that belongs to a user tenant used by the user. Tenant license data includes at least the number of licenses and the remaining number of the licenses assigned to the user.

FIG. 5B indicates an example of tenant license data. Tenant license data has data items such as an article ID, an article name, the number of licenses, the remaining number, and a license number. The article ID and the article name are the same as the article ID and the article name shown in FIG. 5A. The number of licenses is the number that has been purchased by the user for the relevant tenant. The license of which the number of licenses is set to ∞ is a device-common license. The license of which the number of licenses is not set to ∞ is a device-individual license. The remaining number is the remaining number of the licenses available. The license number is a license number that has been purchased by the user for the relevant tenant.

The virtual device configuration data updating unit 315 updates virtual device configuration data corresponding to the image forming apparatus. The virtual device configuration data holding unit 316 stores virtual device configuration data in the auxiliary storage device 204C and the like (and functions as a device information storage unit).

The install application determining unit 317 determines the application to be applied (to be installed) to the image forming apparatus based on basic set application information, the tenant license data, and virtual device configuration data. Hereinafter, a description will be given of the determination processing of the application to be applied to the image forming apparatus.

Firstly, the install application determining unit 317 designates, for example, the application corresponding to basic set application information shown in FIG. 5A as a candidate for installation. In the example shown in FIG. 5A, the installation application determining unit 317 designates IC card login, job audit agent, and HDD encryption as the candidates for installation.

Next, the installation application determining unit 317 determines whether or not virtual device configuration data satisfies the applicable condition of the relevant application (i.e., executes condition determination processing). For example, the applicable condition of the IC card login is IC card RW, and virtual device configuration data corresponding to each device AAA00001, AAA00002, and BBB00001 shown in FIGS. 4A to 4C satisfies the applicable condition. Also, a provision condition of a job audit agent is not needed. Thus, the installation application determining unit 317 determines that all of virtual device configuration data shown in FIGS. 4A to 4C satisfies the condition.

Referring to virtual device configuration data shown in FIGS. 4A to 4C, the applicable condition of HDD encryption is HDD, virtual device configuration data corresponding to the device AAA00001 and BBB00001 satisfies the applicable condition. However, virtual device configuration data corresponding to the device AAA00002 does not satisfy the applicable condition since the device AAA00002 does not have the HDD. The determination that virtual device configuration data does not satisfy the applicable condition by the install application determining unit 317 means that this application is unnecessary for the device corresponding to virtual device configuration data that does not satisfy the condition. Thus, in such case, the install application determining unit 317 does not designate the relevant application as the candidate for install.

Next, the install application determining unit 317 refers to the number of licenses included in a record in tenant license data corresponding to the application being the candidate for install. The installation application determining unit 317 then determines whether or not the license used to apply (install) the application to the image forming apparatus is included in the record (whether or not the remaining number is one or more). When the license used to install the application on the image forming apparatus is present, the install application determining unit 317 reduces one among the remaining number included in license data, and establishes the application as a subject to be applied (and installed). When the license used to apply the application to the image forming apparatus is absent (if the remaining number is zero), the install application determining unit 317 does not treat the relevant application as the subject to be applied.

The virtual license data managing unit 321 generates virtual license data based on the determination result of the application to be applied by the install application determining unit 317, and stores it in the virtual license data holding unit 320. The virtual license data managing unit 321 generates virtual license data for each device corresponding to virtual device configuration data which the install application determining unit 317 designated for condition determination processing in the determination processing.

Here, when the install application determining unit 317 determines that the license used to install the application on the image forming apparatus is absent, the virtual license data managing unit 321 executes following processing. The virtual license managing unit 321 acquires control information that instructs the restricted operation corresponding to the application from the basic set application information. The virtual license data managing unit 321 generates virtual license data including the acquired control information.

FIGS. 6A to 6C indicates an example of virtual license data. Virtual license data has a data item such as an article ID, an article name, and a restricted operation. The article ID to the restricted operation are same as the article ID to the restricted operation held by the setting of the basic set application shown in FIG. 5A. A status is an install status of the application on the image forming apparatus. "Installed" set in the status indicates that the application has been actually installed on the image forming apparatus and is running. "Waiting install" indicates the status in which the application has not yet been installed while the status of the application has been established as the candidate for install. "lack of licenses" indicates the status in which there is a lack of licenses and installation of the application cannot be performed.

The virtual license data managing unit 321 sets "waiting install" in the status corresponding to the application established as a subject to be installed by the installation application determining unit 317. The virtual license data managing unit 321 also sets "lack of license" in the status corresponding to the application determined to lack a license by the installation application determining unit 317. Also, the virtual license data managing unit 321 receives a completion notification via the Internet 104 from the image forming apparatus that installed the application. The virtual license data managing unit 321 then sets "installed" in the status of the application that has been completely installed.

Returning to FIG. 3, the license file generating unit 318 generates a license file based on the license number and the serial ID. The virtual license data managing unit 321 associates the license file with the virtual license data, and causes the virtual license data holding unit 320 to retain virtual license data as application information. The virtual license data holding unit 320 holds virtual license data.

A license management screen displaying unit 319 displays a license management screen. In particular, a license management screen displaying unit 319 generates an HTML file for displaying a license management screen, and transmits the generated screen to the terminal device 102 via the internet 104. A web browser included in the terminal device 102 displays the license management screen based on the HTML file received from the license management screen displaying unit 319.

Figure 7:
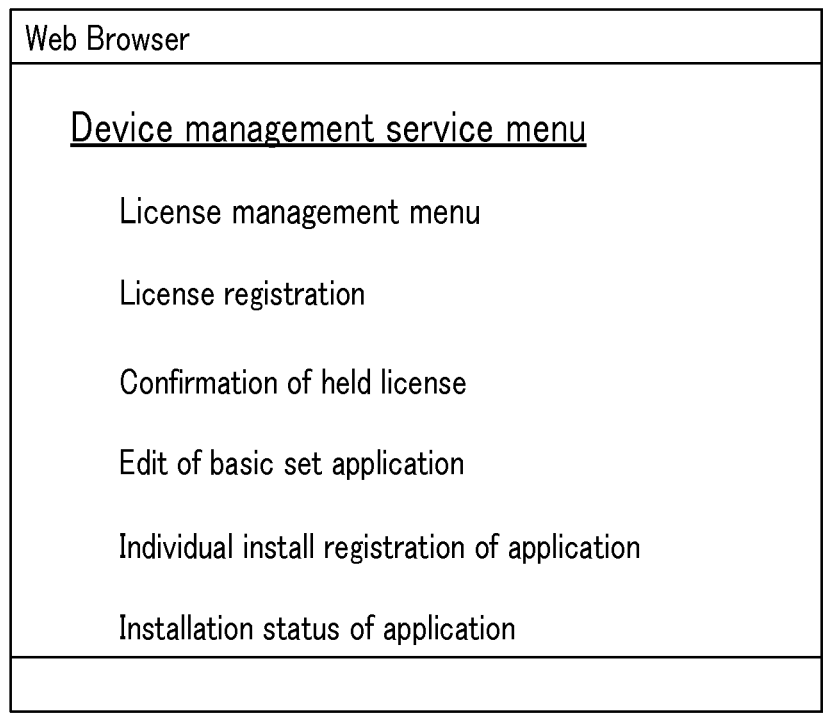
FIG. 7 is a display example of a license management screen.

FIGS. 7 to 12 are diagrams illustrating display examples of a license management screen. FIG. 7 indicates a menu screen displaying a top menu among license management screens. A plurality of menus is displayed with a link in the menu screen. According to the menu selected by the user, the license management screen transits to one of the screens that are shown in FIGS. 8 to 12.

Figure 8A:
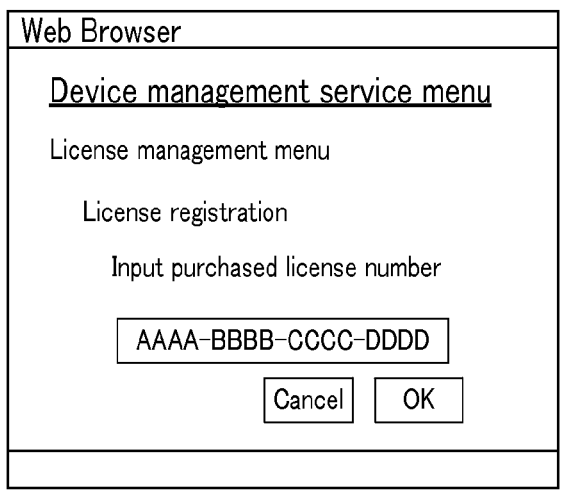
FIGS. 8A to 8C are display examples of a license registration screen.
Figure 8B:
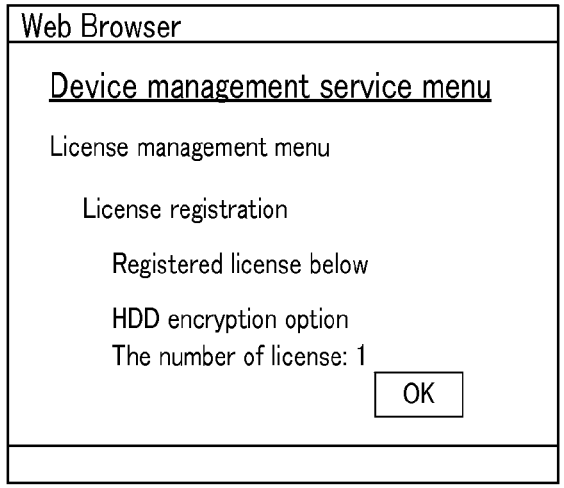
Figure 8C:
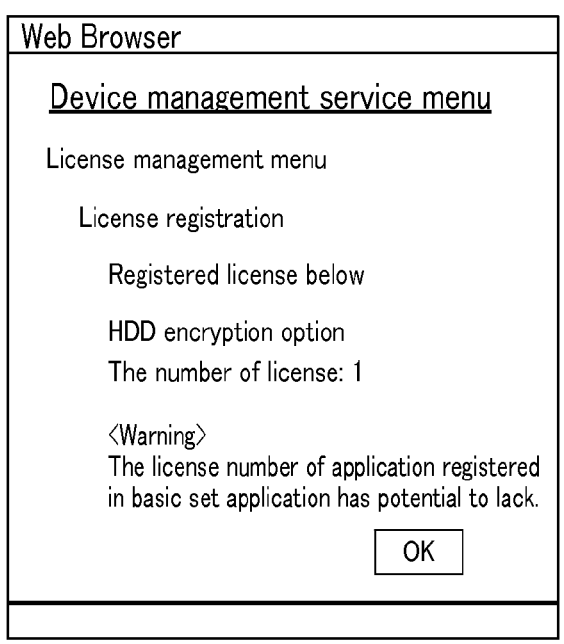

FIG. 8A to 8C are exemplary representations of license registration screens. A license registration screen is for the purpose of registering a license. When the user selects "register license" on the license management screen shown in FIG. 7, the screen transits to the license registration screen. When the user inputs the license number of the purchased article and selects the OK button on the license registration screen shown FIG. 8, this license number is transmitted to the device management service 310. Then, the tenant license data updating unit 313 analyzes the license number.

As a result of the analysis, when the license number is correct, the tenant license data updating unit 313 registers the record of license data corresponding to the license number in the tenant license data holding unit 314. The license management screen displaying unit 319 then displays the license registration screen shown in FIG. 8B on the terminal device 102. The article name and the number of licenses of the registered license are displayed on this license registration screen. As a result of the analysis, when the license number is incorrect, the tenant license data updating unit 313 displays an error screen (not show) on the terminal device 102.

Due to the transmission of the license number to the device management service 310, the license management screen displaying unit 319 may display the license registration screen that includes information indicative of determination processing result of the application to be applied determined by the install application determining unit 317. For example, when there is the lack of license for the basic set application, the license management screen displaying unit 319 displays the license registration screen including a message providing notification about the lack of license.

Figure 9:
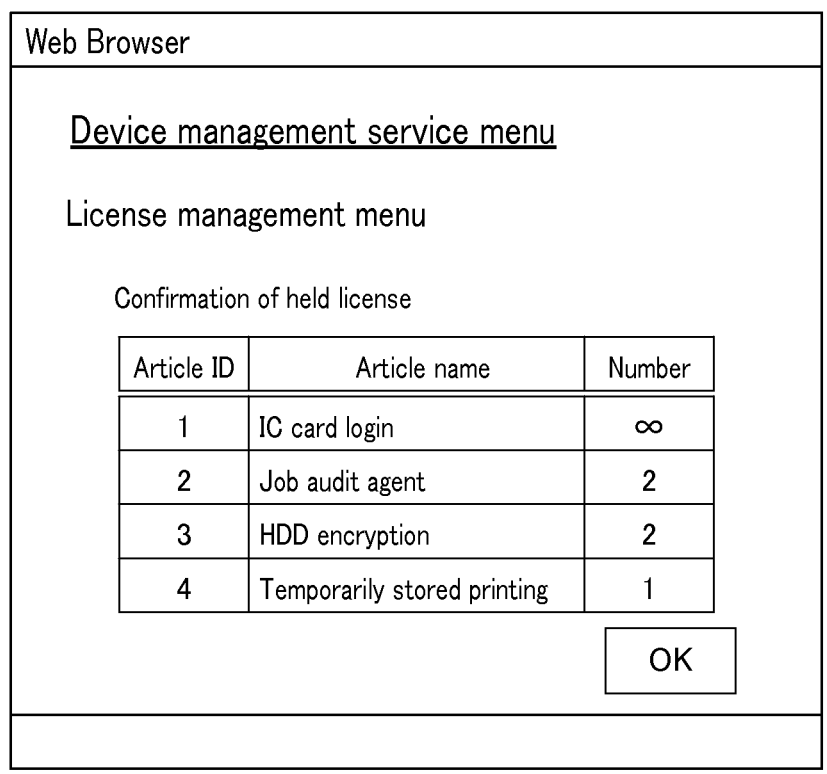
FIG. 9 is a display example of a license confirmation screen.

FIG. 9 is a display example of a license confirmation screen. The license confirmation screen displays information about the license held by the tenant among license management screens. When the user selects "confirmation of holding license" on the license management screen shown in FIG. 7, the screen transits to the device confirmation screen. In particular, a license management screen displaying unit 319 displays information indicating tenant license data stored in the tenant license data holding unit 314 on the license confirmation screen.

Figure 10A:
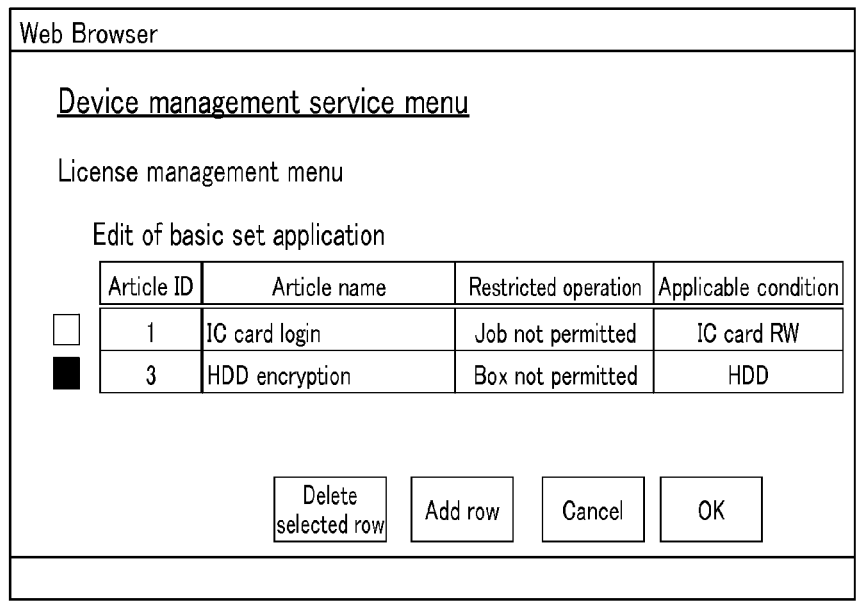
FIG. 10A and FIG. 10B are display examples of a screen for editing a basic set application.
Figure 10B:
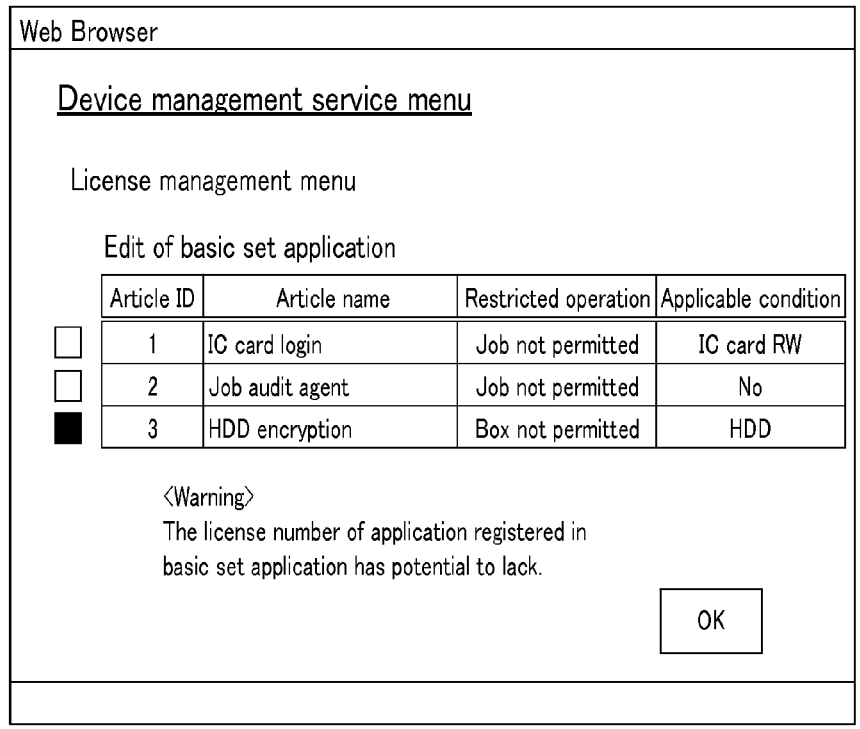

FIG. 10A and FIG. 10B are display examples of screens for editing a basic set application. The screen for editing a basic set application is for editing the basic set application in the license management screen. When the user selects "edit of basic set application" on the license management screen shown in FIG. 7, the screen transits to the screen for editing a basic set application shown in FIG. 10.

The user selects a row addition and then selects the article name if the user intends to newly add the basic set application. The user further selects the restricted operation and the applicable condition if necessary. If the user intends to delete the basic set application, the user selects "deletion of selected row". When the user selects the OK button, the installation application determining unit 317 determines the application to be applied. As a result of the determination processing, when there is the lack of licenses for the basic set application, the license management screen displaying unit 319 displays the screen for editing a basic set application including a message providing notification about the lack of the number of licenses shown in FIG. 10B.

FIG. 11 is a display example of an individual install registration screen. The individual install registration screen is a screen for individually installing and registering of the application. When the user selects "individual installation and registration of application" on the license management screen shown in FIG. 7, the screen transits to the individual install registration screen shown in FIG. 11.

For the application where the license is present in tenant license data, and is not registered in the basic set application, the user needs to order the installation individually. Accordingly, the license management screen displaying unit 319 displays the individual installation and registration screen including information about the application where the license is present in tenant license data, and is not registered in the basic set application.

When the user selects an article intended for installation and a device that to which the article is to be installed and selects the OK button on the individual install registration screen, an instruction according to the selection is transmitted to the device management service 310. The virtual license data managing unit 321 of the device management service 310 receives the transmitted instruction and adds a record corresponding to the article selected by the user in the virtual license data in accordance with the instruction.

FIG. 12A to FIG. 12C are display examples of an install status confirmation screen. The install status confirmation screen is a screen for confirming the install status of the application on the image forming apparatus. When the user selects "install status of application" on the license management screen shown in FIG. 7, the screen transits to the install status confirmation screen shown in FIG. 12. Hereinafter, a description with specific example will be given of how the install status changes.

FIG. 12A indicates the install status in the application in the device AAA00001 and the device BBB00001, which are the image forming apparatuses used by the user. In the status of the device AAA00001, applications 1, 2, and 3 have been installed, and there is no application that is waiting to be installed and lacking the license. In the status of the device BBB00001, applications 1, 2, and 4 have been installed, and there is no application that is waiting to be installed and lacking the license.

Under this condition, it is assumed that the user newly purchased the device AAA00002 and the install application determining unit 317 completed the determination of the application to be applied. As a result of the install determination, when one application is determined to be an application to be installed and two applications that cannot be installed due to the lack of license are found, the license management screen displaying unit 319 displays a screen shown in FIG. 12B.

When the device AAA00002 activates and installs the application to be installed, the license management screen displaying unit 319 displays a screen shown in FIG. 12C. In this screen, "1" is set in the "installed" item corresponding to the device AAA00002.

Figure 13A:
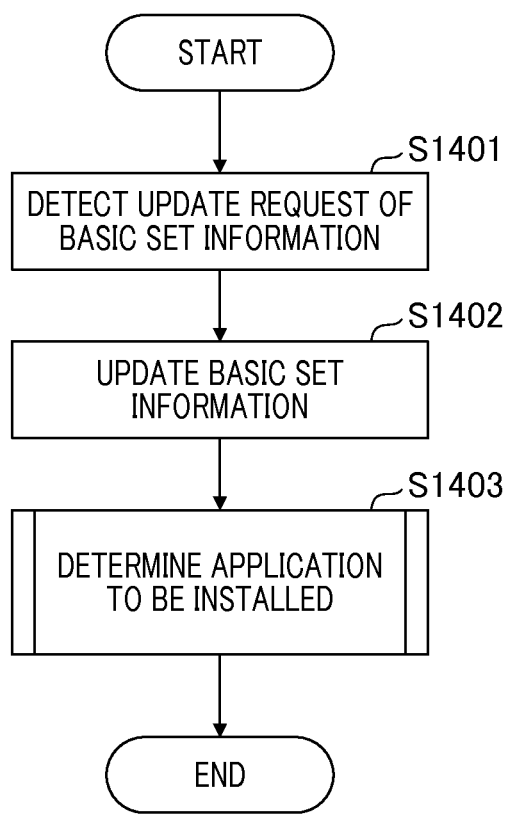
FIG. 13A and FIG. 13B are diagrams for explaining the processing for editing a basic set application.
Figure 13B:
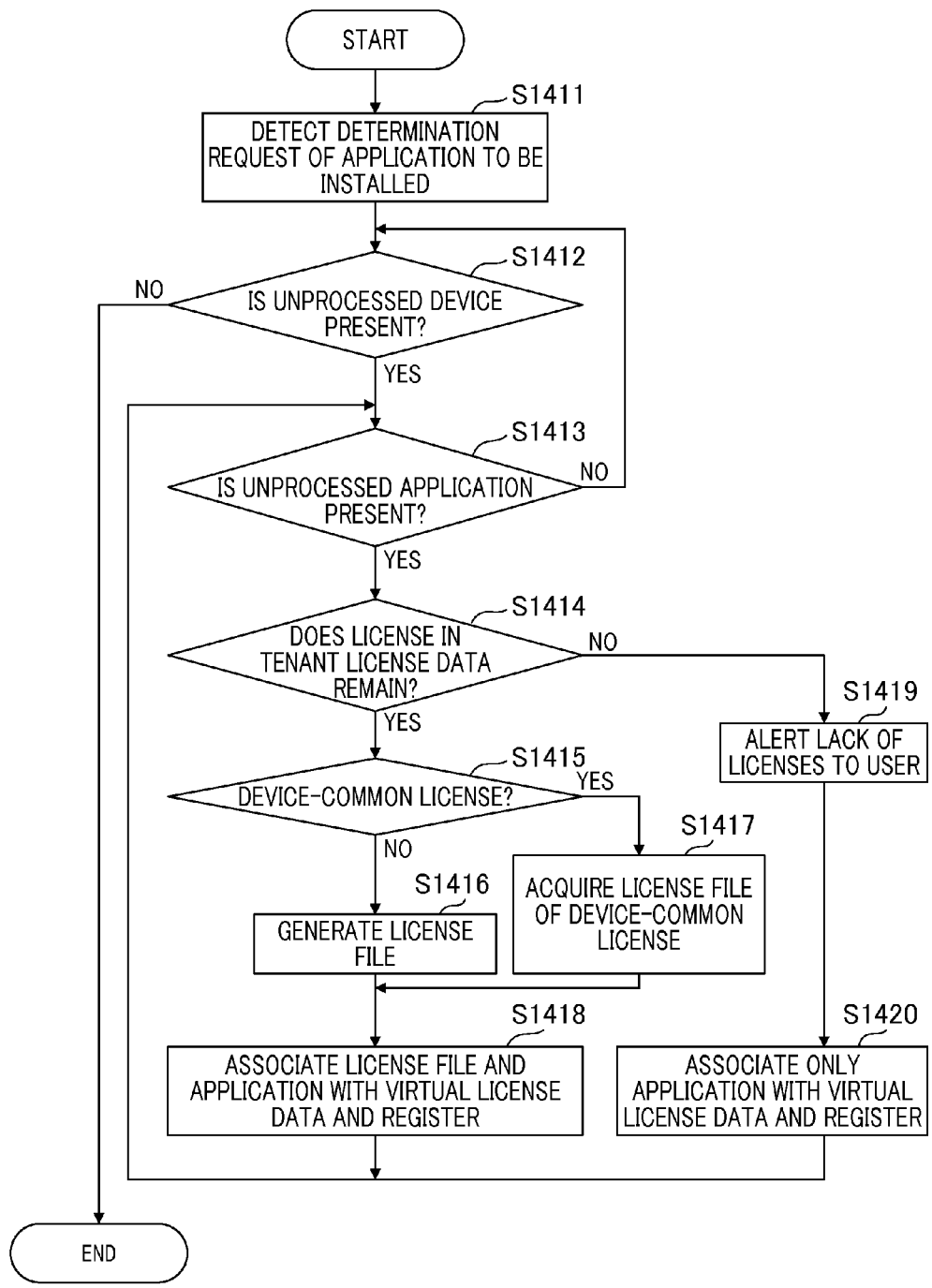

FIG. 13 is an exemplary flowchart describing processing for editing a basic set application. A program that realizes each step shown in FIG. 13A and FIG. 13B is stored one of the non-volatile memory 202C, the volatile memory 203C, or the auxiliary storage device 204C, and executed by the CPU 201C.

Firstly, the terminal device 102 makes an update request of the basic set application to the device management service 310 according to an operation by the user. The basic set application updating unit 311 detects the update request of basic set application information (step 1401). The update request of basic set application information includes a tenant identifier of the tenant to which the user belongs.

Next, the basic set application updating unit 311 updates basic set application information according to the update request of the detected basic set application information (step 1402). The updated basic set application information is stored by the basic set application holding unit 312. In other words, the basic set application updating unit 311 functions as a basic information updating unit that receives the update request of basic set application information via the Internet 104 and updates basic set application information in accordance with this update request.

Next, the install application determining unit 317 executes determination processing of the application to be applied with respect to the image forming apparatus corresponding to the tenant identifier included in the update request of the basic set application (step 1403). In step 1403, the virtual license data managing unit 321 further executes generation processing of virtual license data.

FIG. 13B is an exemplary flowchart that shows the details of the determination processing of the application to be applied and generation processing of virtual license data indicated in step 1403 of FIG. 13A.

Firstly, the basic set application updating unit 311 requests determination processing of the application to be applied to the install application determining unit 317. The install application determining unit 317 detects this request (step 1411) and decides a candidate for install. In other words, the install application determining unit 317 determines whether or not virtual device configuration data satisfies the applicable condition of the application included in updated basic set application information, and decides the candidate for installation based on the determination result.

Next, the install application determining unit 317 determines whether or not an unprocessed device (the image forming apparatus) is present (step 1412). An unprocessed device is a device for which the registration processing of corresponding virtual license data (step 1418 and step 1420) has not been completed. If no unprocessed device is present, the process is ended. If the unprocessed device is present, the installation application determining unit 317 selects such an unprocessed device and makes it a subject to the process. The process then advances to step 1413.

Next, the install application determining unit 317 determines whether or not an unprocessed application is present in basic set application information (step 1413). If no unprocessed application is present in basic set application information, the process returns to step 1412. If an unprocessed application is present in basic set application information, the installation application determining unit 317 selects such an unprocessed application, and the process advance to STEP 1414.

Next, the install application determining unit 317 determines whether or not the license used to install the application remains based on the remaining number corresponding to the selected application included in tenant license data (step 1414). Hereinafter, the description will be given of processing in step 1414.

The install application determining unit 317 refers to tenant license data corresponding to the tenant identifier included in the update request of basic set application information that was detected in step 1401 of FIG. 13(A).

Then, the installation application determining unit 317 determines whether or not the remaining number included in the record corresponding to the selected application of the tenant license data is one or more. If the remaining number is one or more, the installation application determining unit 317 determines that the license used to install the selected application is present. If the remaining number is zero, the installation application determining unit 317 determines that no license used to install the selected application is present (i.e., the lack of licenses).

If the remaining number is zero, the installation application determining unit 317 determines that no license used to install the selected application is present, the process advances to step 1419. If the installation application determining unit 317 determines that the license used to install the selected application is present, the installation application determining unit 317 establishes the relevant application to be the object of installation. The process then advances to step 1415.

In step 1415, the installation application determining unit 317 executes the following processing based on the number of licenses used for installation included in tenant license data. The install application determining unit 317 determines whether the license is a device-common license or a device-individual license. If the install application determining unit 317 determines that the license used to install is the device-common license, the process advances to step 1417. If the license used to install is the device-individual license, the process advances to step 1416.

In step 1416, the license file generating unit 318 generates a license file of the device-individual license (step 1416). In particular, the license file generating unit 318 acquires a license number corresponding to the device-individual license from tenant license data. The license file generating unit 318 also acquires a serial ID included in virtual device configuration data corresponding to the device to be processed. Then, the license file generating unit 318 generates the license file corresponding to the device based on the acquired license number and the serial ID. The license file to be generated is a license file corresponding to the device for which the virtual device configuration data has been determined to satisfy the applicable condition of the application.

In step 1417, the license file generating unit 318 generates the license file of device-common license (step 1417), and the process advances to step 1418. It is assumed that the license file of a device-common license is stored in the tenant license data holding unit 314 in advance. In other words, the license file generating unit 318 generates the license file corresponding to the predetermined device-common license.

In step 1418, the virtual license data managing unit 321 generates virtual license data corresponding to the device to be processed and registers the data (step 1418). In other words, the virtual license data managing unit 321 generates virtual license data corresponding to the image forming apparatus that belongs to the tenant corresponding to basic set application information, and stores the data in the storage unit. The process then returns to step 1413.

A detailed description will be given of the processing in step 1418. The virtual license data managing unit 321 acquires information included in the record corresponding to the established application as the installation object from basic set application information as target application information. The virtual license data managing unit 321 also acquires an installation status in the device of the relevant application. The virtual license data managing unit 321 generates virtual license data based on target application information and the installation status.

The virtual license data managing unit 321 makes the virtual license data holding unit 320 associate generated virtual license data with the license file generated in step 1417 and the substance of the application corresponding to the virtual license data, and makes the virtual license data holding unit 320 hold them. If the device holds the application corresponding to the virtual license data, the virtual license data managing unit 321 associates virtual license data with the license file, and makes the virtual license data holding unit 320 hold them.

In step 1419, the license management screen displaying unit 319 provides notifications (alerts) about the lack of licenses of the application to the terminal device 102 operated by the user (step 1419). The virtual license data managing unit 321 then generates and registers virtual license data (step 1420), the process returns to step 1413. Only the substance of the application is associated with virtual license data generated in step 1420.

FIG. 14 is an exemplary flowchart that describes processing of applying the application to the image forming apparatus. Steps from step 1501 to step 1507 are performed by the image forming apparatus 101. A program that executes these steps is stored in either storage unit among the non-volatile memory 202A, the volatile memory 203A, and the auxiliary storage device 204A, and executed by the CPU 201A. Also, steps from 1521 to step 1523 are performed by the device management service 310. A program that executes these steps is stored in either storage unit among the non-volatile memory 202C, the volatile memory 203C, and the auxiliary storage device 204C, and executed by the CPU 201C.

Firstly, the actual device configuration data notifying unit 306 of the image forming apparatus detects that the power source of the image forming apparatus is switched on (step 1501). Next, the actual device configuration data collecting unit 305 collects device configuration data, and determines whether or not actual device configuration data about which device management service 310 has not been notified has been changed (step 1502). If actual the device configuration data that about which the device management service 310 has not been notified has not changed, the process is ended. If actual device configuration data about which the device management service 310 has been notified has changed, the process advances to step 1503.

Next, the actual device configuration data notifying unit 306 provides notification about an information acquisition request to the virtual license data managing unit 321 of the device management service 310 via the Internet 104 (step 1503). This information acquisition request includes actual device configuration data collected in step 1502 and the tenant identifier held by the tenant identifier holding unit 304. In other words, the actual device configuration data notifying unit 306 functions as a request transmission unit that transmits the information acquisition request. At the same time, the virtual license data managing unit 321 functions as a request reception unit that receives the information acquisition request. The virtual license data acquiring unit 301 then waits for a reply from the device management service 310 (step 1504).

Next, the virtual license data acquiring unit 301 detects the reply from the device management service 310. The virtual license data acquiring unit 301 acquires virtual license data included in the detected reply. In other words, the virtual license data acquiring unit 301 functions as an information reception unit that receives virtual license data generated by the device management service 310 in response to the information acquisition request.

The virtual license data acquiring unit 301 updates actual license data held by the actual license data holding unit 308 by using the acquired virtual license data. The virtual license data acquiring unit 301 then determines whether or not the application to be installed, in other words, the application for which the installation status is in an installation waiting status, is present based on the acquired virtual license data (step 1505). If no application of which the installation status is in the installation waiting status is present, the process is ended. If the application of which the installation status is in the installation waiting status is present, the process advances to step 1506.

Next, the virtual license data acquiring unit 301 downloads the license file and the application from the device management service 310 (step 1506). The license file and the application to be downloaded are a license file and an application associated with acquired virtual license data as stated above. Accordingly, the virtual license data managing unit 321 of the device management service 310 transmits the license file and the application in response to the download request from the virtual license data acquiring unit 301. Then, the application installing unit 302 installs the application with the license file (step 1507). In other words, the application installing unit 302 functions as an application unit that applies the application associated with the license file to the image forming apparatus.

Next, the application aborting unit 303 determines whether or not an unnecessary application to which actual license data has been installed does not apply based on actual license data held by the actual license data holding unit 308 (step 1508). If no unnecessary application has been installed, the process advances to step 1510. If an unnecessary application is installed, the application aborting unit 303 uninstalls the unnecessary application (step 1509).

Next, the restricted operation unit 307 determines whether or not a restricted condition is set in virtual license data acquired in above step 1505 (step 1510). If the restricted condition is not set in virtual license data, the process is ended. If the restricted condition is set in virtual license data, restricted operation unit 307 executes function limiting processing dependent on the restricted operation (step 1511). In particular, if non-permission of a job is set in the restricted operation, the restricted operation unit 307 restricts the function of the image forming apparatus such that the image forming apparatus does not execute the job. Also, if the non-permission of a box is set in the restricted operation, the restricted operation unit 307 restricts the function of the image forming apparatus such that the image forming apparatus does not utilize the box.

In step 1521, the virtual device configuration data updating unit 315 receives the information acquisition request from the image forming apparatus (step 1521). The virtual device configuration data updating unit 315 then acquires the tenant identifier and actual device configuration data included in the received information acquisition request.

The virtual device configuration data updating unit 315 acquires the serial ID included in the actual device configuration data. The virtual device configuration data updating unit 315 then searches the virtual device configuration data corresponding to the above acquired tenant identifier and virtual device configuration data among virtual device configuration data held by the virtual device configuration data holding unit 316. The virtual device configuration data updating unit 315 overwrites the searched virtual device configuration data with actual device configuration data (step 1522).

Next, the device management service 310 executes determination processing and generation processing of the application to be applied to the device corresponding to the virtual device configuration data (step 1523).

The process in step 1523 is performed by same technique in step 1403 of FIG. 13(A). In other words, the install application determining unit 317 functions as a first determining unit that determines whether or not configuration information included in the information acquisition request satisfies the applicable condition of the application included in basic set application information.

Also, if the install application determining unit 317 determines that configuration information of device that satisfies the applicable condition of the application included in basic set application information, the installation application determining unit 317 functions as a second determining unit. In other words, the installation application determining unit 317 refers to the remaining number corresponding to the application included in tenant license data stored in the tenant license data holding unit 314. The installation application determining unit 317 then determines whether or not the license for utilizing to install the application on the image forming apparatus is present based on the remaining number.

Also, if the install application determining unit 317 determines that the license used to install the application on the image forming apparatus is present, the virtual license data managing unit 321 functions as an information generating unit that executes following processing. The virtual license data managing unit 321 generates virtual license data indicative of application information including necessary information for installing the application by the image forming apparatus that is the transmission source of the information acquisition request.

Then, the virtual license data managing unit 321 functions as an information transmission unit that transmits the generated virtual license data back to the image forming apparatus that is the transmission source of the information acquisition request as a response to the information acquisition request.

According to the management device of the present invention, the management device automatically distributes the application to be applied to the image forming apparatus when configuration information of the device of the image forming apparatus is changed. Therefore, for example, an IT manager does not need to set a distribution instruction of the application again when the user newly purchased additional image forming apparatus. This enables management cost reduction for the IT manager.

Next, a description will be given of other embodiment. In this embodiment, the server computer group 105 shown in FIG. 1 includes one server computer 210A. The server computer group 105 may be provided in the user environment 100, the serviceman environment 110, or the vender environment 120 providing the image forming apparatus. Also, the serviceman may be allowed to use the terminal device 102A located in the user environment 100 with the permission of the user. Also, the server computer 210A and the server computer 210B shown in FIG. 2 may communicate with each other via the Internet 104.

Alternatively, the application aborting unit 303 may stop or uninstall the application according to the user instruction. If the configuration in which the application aborting unit 303 stops or uninstalls the application according to the user instruction is employed, the restricted operation unit 307 performs a predetermined restricted operation corresponding to the image forming apparatus. Also, if the application that is requested stop or uninstall by the user is a basic set application, the application aborting unit 303 may carry out control so as not to receive the request.

Alternatively, the image forming apparatus 101 may include an actual device configuration data holding unit (not illustrated) that constantly stores the actual device configuration data in the auxiliary storage device 204A. The actual device configuration data collecting unit 305 monitors any changes in the actual device configuration data, notifies the actual device configuration data holding unit when a changed content has been detected, and then reflects the changed content in actual device configuration data.

Alternatively, the user may every time input the tenant identifier to the input device 206A in the image forming apparatus. The timing for input may a timing of activation of the image forming apparatus, and other timings may available. In this case, the tenant identifier is stored in the volatile memory 203A.

Alternatively, based on the fact as a trigger that the image forming apparatus is switched on, the actual device configuration data notifying unit 306 may make the acquisition request for virtual license data with the input device 206A by the user rather than transmit actual device configuration data to the device management service 310.

Alternatively, the generation of the license file by the license file generating unit 318 provided in the device management service 310 may be omitted. In other words, the image forming apparatus may include a processing unit capable of installing or activating the application using the license number.

Alternatively, the install application determining unit 317 may automatically purchase the license of the application from a predetermined license management service (omitted illustration) due to the detection of the lack of licenses. The install application determining unit 317 may also end the operation that causes the lack of licenses with an error.

Alternatively, the basic set application updating unit 311 may automatically set the restricted condition and the applicable condition of the application by referring to manifest data included in the program file of the application rather than follow the user input.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251464 filed Nov. 17, 2011, which is hereby incorporated by reference herein in its entirety.

What is claimed is:

1. A management device for managing applying an application to an image forming apparatus for each preset management range, the management device comprising:
    a basic information storage unit configured to store basic information including at least identification information and an applicable condition of the application, the basic information regarding the application as an object of application in common with the image forming apparatus that belongs to the management range;
    a license information storage unit configured to store license information including at least the number of licenses and a remaining number of the licenses assigned to the user, the license information regarding the license of the application that is applied to the image forming apparatus being used by the user and belonging to the management range of the user;
    a request reception unit configured to receive an information acquisition request that includes device configuration information of the image forming apparatus from the image forming apparatus via a network when the device configuration information has been changed in the image forming apparatus, the information acquisition request regarding the application that is applied to the image forming apparatus;
    a first determining unit configured to determine whether or not the device configuration data included in the received information acquisition request satisfies the applicable condition of the application included in the basic information;
    a second determining unit configured to determine whether or not the license used to apply the application to the image forming apparatus is present based on the remaining number corresponding to the application included in the license information stored in the license information storage unit when the first determining unit has determined that the device configuration data satisfied the applicable condition of the application include in the basic information;
    an information generating unit configured to generate application information necessary for applying the application by the image forming apparatus that is the transmission source of the information acquisition request when the second determination unit has determined that the license used to apply the application to the image forming apparatus was present; and
    an information transmission unit configured to transmit the generated application information to the image forming apparatus that is the transmission source of the information acquisition request via the network.

2. The management device according to claim 1,
wherein the basic information further includes control information that orders a restricted operation to the image forming apparatus to be applied to the application when the second determining unit has determined that no license used to apply the application to the image forming apparatus was present, and
wherein the information generating unit acquires the control information corresponding to the application from the basic information, and generates the application information including the acquired control information, and the information transmission unit transmits the generated application information to the image forming apparatus that is the transmission source of the information acquisition request when the second determining unit has determined that no license for used apply the application to the image forming apparatus was present.

3. The management device according to claim 1,
wherein the management device further comprises:
    a device information storage unit configured to store device configuration data of the image forming apparatus belonging to the management range; and
    a basic information updating unit configured to receive an update request of the basic information via the network, update basic information stored in the storage unit in response to the update request from the basic information,
wherein the first determining unit determines whether or not the device configuration data stored in the device configuration information storage unit satisfies the applicable condition included in the updated basic information due to the updated basic information, and when the first determining unit has determined that the device configuration data satisfied the applicable condition of the application included in the updated basic information, the second determining unit determines whether or not the license used to apply the application to the image forming apparatus is present based on the remaining number corresponding to the application included in the license information stored in the license information storage unit, and the information generating unit generates the application information corresponding to the image forming apparatus belonging to the management range corresponding to the basic information when the second determining unit has determined that the license used in applying the application to the image forming apparatus was present.

4. The management device according to claim 1,
wherein the management device further comprises:
    a license file generating unit configured to generate a license file necessary for applying the application by the image forming apparatus, when the second determining unit has determined that the license used to apply the application to the image forming apparatus was present,
wherein the information generating unit stores the application information including the generated license file in the storage unit, and
wherein the information transmission unit transmits the application information including the license file to the image forming apparatus that is the transmission source of the information acquisition request.

5. The management device according to claim 4,
wherein the information generating unit determines whether or not the license is a common license for all of the image forming apparatuses managed by the management device based on the number of licenses of the licenses included in the license information stored in the license information, stores the application information including the license file corresponding to the predetermined common license in the storage unit when the license is the common license, and stores the application information including the license file corresponding to the image forming apparatus where the first determining unit has determined that the device configuration data satisfied the applicable condition of the application when the license is not the common license when the second determining unit determined the license for utilizing to apply the application to the image forming apparatus was present.

6. An information processing system comprising the management device and the image forming apparatus according to claim 1, wherein the image forming apparatus comprises:

a request transmission unit configured to transmit the information acquisition request via the network;

an information reception unit configured to receive the application information generated by the management device from the management device in response to the information acquisition request via the network; and an application unit configured to apply the application corresponding to the application information to the image forming apparatus based on the received application information.

7. A method for managing a management device for managing applying an application to an image forming apparatus for each management range, wherein the management device comprises:

a basic information storage unit configured to store basic information including at least identification information and an applicable condition of the application, the basic information regarding the application as an object to apply in common with the image forming apparatus belonging to the management range; and a license information storage unit configured to store license information including at least the number of licenses and a remaining number of the license assigned to the user, the license information regarding the license of the application that is applied to the image forming apparatus being used by the user and belonging to the management range of the user, and wherein the method comprises:

receiving, by the management device, the information acquisition request including device configuration data of the image forming apparatus from the image forming apparatus via a network when the device configuration information has been changed in the image forming apparatus, the information acquisition request regarding the application that is applied to the image forming apparatus;

determining, by the management device, whether or not the device configuration data included in the received information acquisition request satisfies an applicable condition included in the basic information;

determining, by the management device, whether or not the license used to apply the application to the image forming apparatus is present based on the remaining number corresponding to the application included in the license information stored in the license information storage unit when the device configuration data has been determined to satisfy the applicable condition of the application included in the basic information;

generating, by the management device, application information including necessary for applying the application to the image forming apparatus that is the transmission source of the information acquisition request when the license used in applying the application to the image forming apparatus has been determined to be present; and transmitting, by the management device, the generated application information to the image forming apparatus that is the transmission source of the information acquisition request via the network.

8. A non-transitory storage medium on which is stored a computer program for making a computer execute a method for managing a management device for managing applying an application to an image forming apparatus for each preset management range, wherein the management device comprises:

a basic information storage unit configured to store basic information including at least identification information and an applicable condition of the application, the basic information for the application as an object to apply in common with the image forming apparatus that belongs to the management range; and a license information storage unit configured to store license information including at least the number of licenses and a remaining number of the licenses assigned to the user, the license information for the license of the application that is applied to the image forming apparatus being used by the user and belonging to the management range of the user, and wherein the method comprises:

receiving, by the management device, the information acquisition request including device configuration data of the image forming apparatus from the image forming apparatus via a network when the device configuration information has been changed in the image forming apparatus, the information acquisition request for the application that is applied to the image forming apparatus;

determining, by the management device, whether or not the device configuration data included in the received information acquisition request satisfies an applicable condition included in the basic information;

determining, by the management device, whether or not the license used in applying the application to the image forming apparatus is present based on the remaining number corresponding to the application included in the license information stored in the license information storage unit when the device configuration data has been determined to satisfy the applicable condition of the application included in the basic information;

generating, by the management device, application information including necessary for applying the application to the image forming apparatus that is the transmission source of the information acquisition request when the license for utilizing to apply the application to the image forming apparatus has been determined to be present; and transmitting, by the management device, the generated application information to the image forming apparatus who is the transmission source of the information acquisition request via the network.

* * * * *